US012628126B2

(12) United States Patent
Jiang et al.

(10) Patent No.: US 12,628,126 B2
(45) Date of Patent: May 12, 2026

(54) METHOD AND DEVICE IN NODES USED FOR WIRELESS COMMUNICATION

(71) Applicant: Apogee 5G Global, LLC, Plano, TX (US)

(72) Inventors: Qi Jiang, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 388 days.

(21) Appl. No.: 17/984,258

(22) Filed: Nov. 10, 2022

(65) Prior Publication Data

US 2023/0156666 A1 May 18, 2023

(30) Foreign Application Priority Data

Nov. 12, 2021 (CN) .......................... 202111336588.4

(51) Int. Cl.
*H04W 72/02* (2009.01)
*H04L 5/00* (2006.01)
(Continued)

(52) U.S. Cl.
CPC ........... *H04W 72/02* (2013.01); *H04L 5/0051* (2013.01); *H04W 72/0446* (2013.01); *H04W 72/0453* (2013.01)

(58) Field of Classification Search
CPC . H04W 72/02; H04W 72/27; H04W 72/0446; H04W 72/0453; H04L 5/0053; H04L 5/0048; H04L 5/0051; H04L 5/0094
See application file for complete search history.

(56) References Cited

U.S. PATENT DOCUMENTS

| | | | |
|---|---|---|---|
| 11,985,670 B2* | 5/2024 | Panteleev | ............. H04W 72/23 |
| 12,218,862 B2 | 2/2025 | Liu et al. | |

(Continued)

FOREIGN PATENT DOCUMENTS

| | | |
|---|---|---|
| CN | 112713972 A | 4/2021 |
| CN | 113079569 A | 7/2021 |
| CN | 113114435 A | 7/2021 |

OTHER PUBLICATIONS

Third Generation Partnership Project, "Technical Specification Group Radio Access Network; NR; Physical channels and modulation (Release 16)," 3GPP TS 38.211 V16.7.0 (Sep. 2021).

(Continued)

*Primary Examiner* — Brian D Nguyen
(74) *Attorney, Agent, or Firm* — Volpe Koenig

(57) ABSTRACT

Disclosure provides a method and device in nodes used for wireless communications. A node first transmits a first signaling, the first signaling being used to determine a first time-frequency resource pool; and then monitors a second signaling in the first time-frequency resource pool; the first time-frequency resource pool comprises a first time-frequency resource set and a second time-frequency resource set, and time-frequency resources occupied by the second signaling belong to the first time-frequency resource set or the second time-frequency resource set; the first signaling is used to trigger the second signaling; a first ID is used to generate the second signaling, a first information block is used to generate the second signaling, the first information block is used to determine at least one of a candidate time-frequency resource set or a candidate reference signal resource set. The application improves the interaction mode under full duplex, thereby optimizing the system performance.

20 Claims, 4 Drawing Sheets

(51) Int. Cl.
*H04W 72/0446* (2023.01)
*H04W 72/0453* (2023.01)

(56) References Cited

U.S. PATENT DOCUMENTS

| 12,245,233 | B2 * | 3/2025 | Wang | ......................... | H04L 1/08 |
|---|---|---|---|---|---|
| 2023/0354347 | A1 * | 11/2023 | Kim | ...................... | H04L 1/0009 |
| 2024/0178903 | A1 * | 5/2024 | Go | ......................... | H04W 16/28 |
| 2024/0357639 | A1 * | 10/2024 | Wang | .................... | H04W 72/20 |
| 2025/0038823 | A1 * | 1/2025 | Go | ......................... | H04W 72/21 |

OTHER PUBLICATIONS

Third Generation Partnership Project, "Technical Specification Group Radio Access Network; NR; Multiplexing and channel coding (Release 16)," 3GPP TS 38.212 V16.7.0 (Sep. 2021).

Third Generation Partnership Project, "Technical Specification Group Radio Access Network; NR; Physical layer procedures for control (Release 16)," 3GPP TS 38.213 V16.7.0 (Sep. 2021).

Third Generation Partnership Project, "Technical Specification Group Radio Access Network; NR; Physical layer procedures for data (Release 16)," 3GPP TS 38.214 V16.7.0 (Sep. 2021).

Third Generation Partnership Project, "Technical Specification Group Radio Access Network; NR; Medium Access Control (MAC) protocol specification (Release 16)," 3GPP TS 38.321 V16.6.0 (Sep. 2021).

Third Generation Partnership Project, "Technical Specification Group Radio Access Network; NR; Radio Resource Control (RRC) protocol specification (Release 16)," 3GPP TS 38.331 V16.6.0 (Sep. 2021).

\* cited by examiner

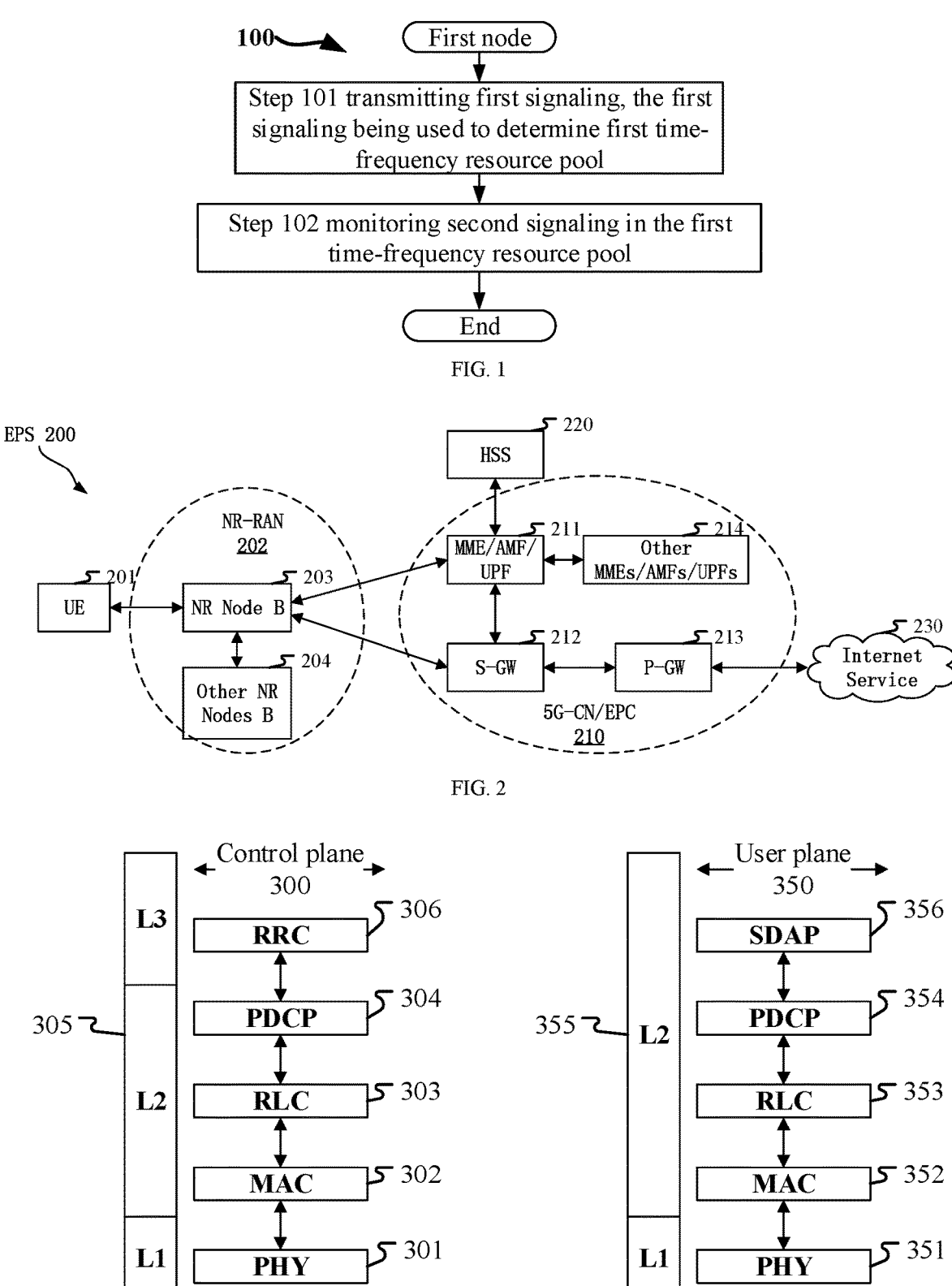

100

First node

Step 101 transmitting first signaling, the first signaling being used to determine first time-frequency resource pool Step 102 monitoring second signaling in the first time-frequency resource pool End

FIG. 1

EPS 200

220
HSS

NR-RAN
202

201
UE

203
NR Node B

204
Other NR Nodes B

211
MME/AMF/UPF

214
Other MMEs/AMFs/UPFs

212
S-GW

213
P-GW

230
Internet Service

5G-CN/EPC
210

FIG. 2

Control plane
300

L3

306
RRC

L2

304
PDCP

303
RLC

302
MAC

L1

301
PHY

305

User plane
350

L2

356
SDAP

354
PDCP

353
RLC

352
MAC

L1

351
PHY

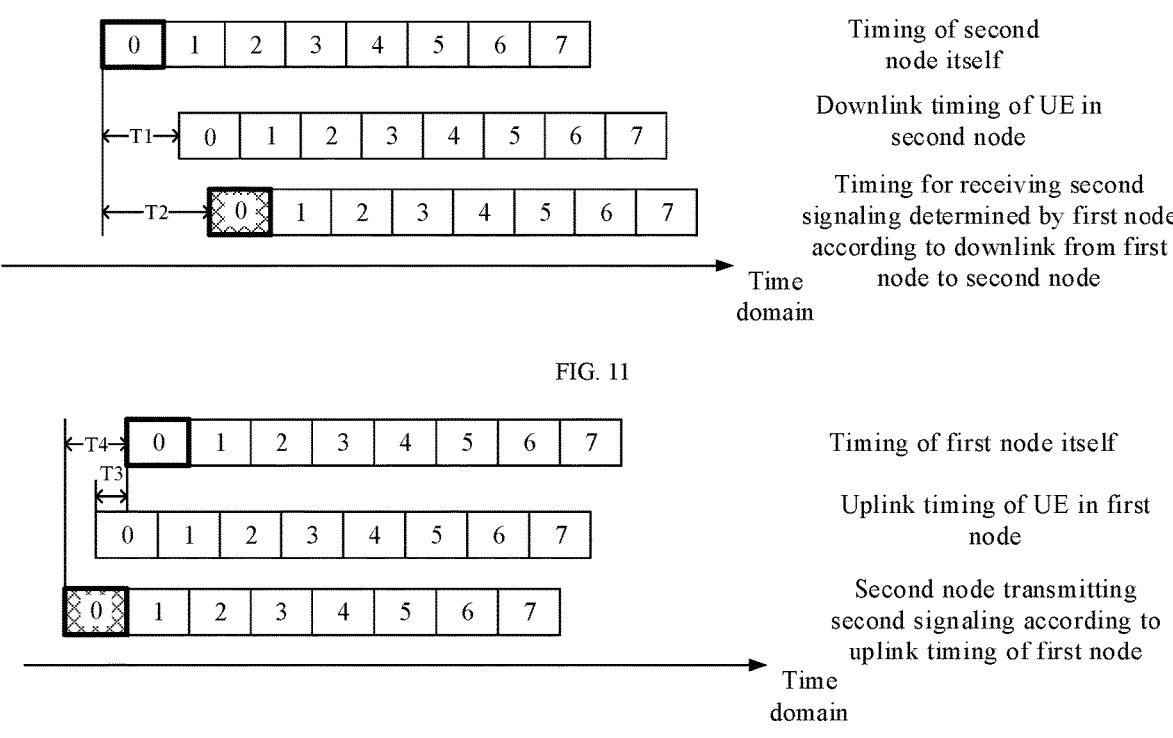

Timing of second
node itself

Downlink timing of UE in
second node

Timing for receiving second
signaling determined by first node
according to downlink from first
node to second node Time
domain

FIG. 11

Timing of first node itself

Uplink timing of UE in first
node

Second node transmitting
second signaling according to
uplink timing of first node Time
domain

FIG. 12

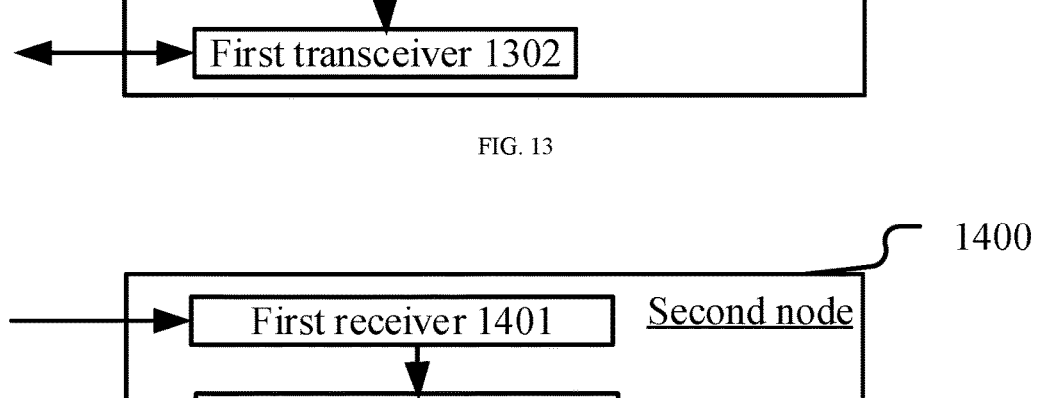

1300

First transmitter 1301

First transceiver 1302

First node

First receiver 1401

Second transceiver 1402

Second node

FIG. 14

METHOD AND DEVICE IN NODES USED FOR WIRELESS COMMUNICATION

CROSS REFERENCE TO RELATED APPLICATIONS

This application claims the priority benefit of Chinese Patent Application No. 202111336588.4, filed on Nov. 12, 2021, the full disclosure of which is incorporated herein by reference.

BACKGROUND

Technical Field

The present application relates to transmission methods and devices in wireless communication systems, and in particular to a transmission scheme and device related to flexible transmission direction configuration in wireless communications.

Background

Application scenarios of future wireless communication systems are becoming increasingly diversified, and different application scenarios have different performance demands on systems. In order to meet different performance requirements of various application scenarios, it was decided at 3rd Generation Partner Project (3GPP) Radio Access Network (RAN) #72th plenary that a study on New Radio (NR), or what is called Fifth Generation (5G) shall be conducted. The work item of NR was approved at 3GPP RAN #75th plenary to standardize NR. It was decided to start a Study Item (SI) and a Work Item (WI) of NR Rel-17 at 3GPP RAN #86th plenary, and it is anticipated that an SI and WI of NR Rel-18 will be approved at 3GPP RAN #94eth plenary.

In NR technology, enhanced Mobile BroadBand (eMBB), Ultra-reliable and Low Latency Communications (URLLC), and massive Machine Type Communications (mMTC) are three main application scenarios. In NR Rel-16 system, the main difference between frame structures of Long-Term Evolution (LTE) and LTE-A is that symbols in a slot can be configured as Downlink, Uplink and Flexible, where for symbols configured as "Flexible", the terminal will receive Downlink on the symbol, and the symbol can also be used for Uplink scheduling. The above method is more flexible than LTE and LTE-A systems.

SUMMARY

In the existing NR system, the base stations can interact through an Xn Interface. In the future Full Duplex system, considering the advantages of Spatial Division Multiplexing (SDM) and the use of massive antennas, the base stations can interact through an air interface to improve the timeliness and efficiency of interaction, so as to improve the performance gains brought by coordinated scheduling and joint transmission.

The application discloses a solution to the problem incurred by the interaction between base stations through an air interface in a full duplex scenario. It should be noted that in the description of the application, flexible duplex mode is only used as a typical application scenario or example; the application is also applicable to other scenarios confronting similar problems (such as scenarios where link direction changes, or other scenarios supporting multi-level configuration of the transmission direction, or a base station or a UE with stronger capabilities, such as scenarios supporting full duplex on a same frequency, or for different application scenarios, such as eMBB and URLLC), where similar technical effects can be achieved. Additionally, the adoption of a unified solution for various scenarios, including but not limited to scenarios of eMBB and URLLC, contributes to the reduction of hardware complexity and costs. If no conflict is incurred, embodiments in a first node in the present application and the characteristics of the embodiments are also applicable to a second node, and vice versa. Particularly, for interpretations of the terminology, nouns, functions and variants (if not specified) in the present application, refer to definitions given in Technical Specification (TS)36 series, TS38 series and TS37 series of 3GPP specifications.

The present application provides a method in a first node for wireless communications, comprising:

transmitting a first signaling, the first signaling being used to determine a first time-frequency resource pool; and monitoring a second signaling in the first time-frequency resource pool;

herein, the first time-frequency resource pool comprises a first time-frequency resource set and a second time-frequency resource set, and time-frequency resources occupied by the second signaling belong to the first time-frequency resource set or the second time-frequency resource set; the first signaling is used to trigger the second signaling; a first identity (ID) is used to generate the second signaling, a first information block is used to generate the second signaling, the first information block is used to determine at least one of a candidate time-frequency resource set or a candidate reference signal resource set; whether the second signaling comprises the first ID is related to whether the first signaling comprises the first ID; when the first signaling comprises the first ID, the second signaling does not comprise the first ID; when the first signaling does not comprise the first ID, the second signaling comprises the first ID; the first ID is a non-negative integer.

In one embodiment, one technical feature of the above method is in: while the flexibility of the system implementation is ensured, the overall performance of the system can also be improved.

In one embodiment, another technical feature of the above method is in: the base station interacts through an air interface to achieve more dynamic and flexible coordinated scheduling or joint transmission, thereby improving the gains brought by the system under the multi-antenna condition.

In one embodiment, another technical feature of the above method is in: radio signals used for interactions between base stations through an air interface are scrambled by the first ID, thus avoiding intra-cell and inter-cell interferences.

According to one aspect of the present application: when the first signaling comprises the first ID, time-frequency resources occupied by the second signaling belong to the first time-frequency resource set; when the first signaling does not comprise the first ID, time-frequency resources occupied by the second signaling belong to the second time-frequency resource set.

According to one aspect of the present application, the first signaling and the second signaling are respectively transmitted via different interfaces.

In one embodiment, another technical feature of the above method is in: in the interaction method proposed in the application, the base stations will interact on a wired link and a radio link at the same time to reduce the air interface signaling overhead and improve efficiency.

According to one aspect of the present application: when the first signaling comprises the first ID, a slot format corresponding to the first time-frequency resource set for the first node is uplink; when the first signaling does not comprise the first ID, a slot format corresponding to the second time-frequency resource set for the first node is flexible.

According to one aspect of the present application, the first ID is a physical cell ID, or the first ID is a Radio Network Temporary Identifier (RNTI), or the first ID is related to both a physical cell ID and an RNTI.

According to one aspect of the present application, comprising:

receiving a third signaling;

herein, the third signaling is used to indicate a first time-frequency resource block, and the second signaling occupies the first time-frequency resource block; a CRC comprised in the third signaling is scrambled through the first ID; the third signaling is a physical-layer dynamic signaling.

According to one aspect of the present application, a time for transmitting the second signaling is a target timing; a downlink timing of a transmitter of the second signaling is a first timing, and an uplink receiving timing for the first node is a second timing; when the first signaling does not comprise the first ID, the target timing is the first timing; when the first signaling comprises the first ID, the target timing is the second timing.

According to one aspect of the present application, comprising:

transmitting a first signal;

herein, there exists an overlapping in time-domain resources occupied by the first signal and time-domain resources occupied by the second signaling; the second signaling and the first signal are respectively transmitted via different interfaces.

According to one aspect of the present application, comprising:

receiving a first signal;

herein, there exists an overlapping in time-domain resources occupied by the first signal and time-domain resources occupied by the second signaling; the second signaling and the first signal are respectively transmitted via different interfaces.

The present application provides a method in a second node for wireless communications, comprising:

receiving a first signaling, the first signaling being used to determine a first time-frequency resource pool; and transmitting a second signaling in the first time-frequency resource pool;

herein, the first time-frequency resource pool comprises a first time-frequency resource set and a second time-frequency resource set, and time-frequency resources occupied by the second signaling belong to the first time-frequency resource set or the second time-frequency resource set; the first signaling is used to trigger the second signaling; a first ID is used to generate the second signaling, a first information block is used to generate the second signaling, the first information block is used to determine at least one of a candidate time-frequency resource set or a candidate reference signal resource set; whether the second signaling comprises the first ID is related to whether the first signaling comprises the first ID; when the first signaling comprises the first ID, the second signaling does not comprise the first ID; when the first signaling does not comprise the first ID, the second signaling comprises the first ID; the first ID is a non-negative integer.

According to one aspect of the present application: when the first signaling comprises the first ID, time-frequency resources occupied by the second signaling belong to the first time-frequency resource set; when the first signaling does not comprise the first ID, time-frequency resources occupied by the second signaling belong to the second time-frequency resource set.

According to one aspect of the present application, the first signaling and the second signaling are respectively transmitted via different interfaces.

According to one aspect of the present application: when the first signaling comprises the first ID, a slot format corresponding to the first time-frequency resource set for the first node is uplink; when the first signaling does not comprise the first ID, a slot format corresponding to the second time-frequency resource set for the first node is flexible.

According to one aspect of the present application, the first ID is a physical cell ID, or the first ID is an RNTI, or the first ID is related to both a physical cell ID and an RNTI.

According to one aspect of the present application, comprising:

transmitting a third signaling;

herein, the third signaling is used to indicate a first time-frequency resource block, and the second signaling occupies the first time-frequency resource block; a CRC comprised in the third signaling is scrambled through the first ID; the third signaling is a physical-layer dynamic signaling.

According to one aspect of the present application, a time for transmitting the second signaling is a target timing; a downlink timing of a transmitter of the second signaling is a first timing, and an uplink receiving timing for the first node is a second timing; when the first signaling does not comprise the first ID, the target timing is the first timing; when the first signaling comprises the first ID, the target timing is the second timing.

According to one aspect of the present application, comprising:

receiving a first signal;

herein, there exists an overlapping in time-domain resources occupied by the first signal and time-domain resources occupied by the second signaling; the second signaling and the first signal are respectively transmitted via different interfaces.

According to one aspect of the present application, comprising:

transmitting a first signal;

herein, there exists an overlapping in time-domain resources occupied by the first signal and time-domain resources occupied by the second signaling; the second signaling and the first signal are respectively transmitted via different interfaces.

The present application provides a first node for wireless communications, comprising:

a first transmitter, transmitting a first signaling, the first signaling being used to determine a first time-frequency resource pool; and a first transceiver, monitoring a second signaling in the first time-frequency resource pool;

herein, the first time-frequency resource pool comprises a first time-frequency resource set and a second time-frequency resource set, and time-frequency resources occupied by the second signaling belong to the first time-frequency resource set or the second time-frequency resource set; the first signaling is used to trigger the second signaling; a first ID is used to generate the second signaling, a first information block is used to generate the second signaling, the first information block is used to determine at least one of a candidate time-frequency resource set or a candidate reference signal resource set; whether the second signaling comprises the first ID is related to whether the first signaling comprises the first ID; when the first signaling comprises the first ID, the second signaling does not comprise the first ID; when the first signaling does not comprise the first ID, the second signaling comprises the first ID; the first ID is a non-negative integer.

The present application provides a second node for wireless communications, comprising:

a first receiver, receiving a first signaling, the first signaling being used to determine a first time-frequency resource pool; and a second transceiver, transmitting a second signaling in the first time-frequency resource pool;

herein, the first time-frequency resource pool comprises a first time-frequency resource set and a second time-frequency resource set, and time-frequency resources occupied by the second signaling belong to the first time-frequency resource set or the second time-frequency resource set; the first signaling is used to trigger the second signaling; a first ID is used to generate the second signaling, a first information block is used to generate the second signaling, the first information block is used to determine at least one of a candidate time-frequency resource set or a candidate reference signal resource set; whether the second signaling comprises the first ID is related to whether the first signaling comprises the first ID; when the first signaling comprises the first ID, the second signaling does not comprise the first ID; when the first signaling does not comprise the first ID, the second signaling comprises the first ID; the first ID is a non-negative integer.

BRIEF DESCRIPTION OF THE DRAWINGS

Other features, objects and advantages of the present application will become more apparent from the detailed description of non-restrictive embodiments taken in conjunction with the following drawings:

FIG. 1 illustrates a flowchart of the processing of a first node according to one embodiment of the present application;

FIG. 2 illustrates a schematic diagram of a network architecture according to one embodiment of the present application;

FIG. 3 illustrates a schematic diagram of a radio protocol architecture of a user plane and a control plane according to one embodiment of the present application;

FIG. 11 illustrates a schematic diagram of a timing for transmitting a second signaling according to one embodiment of the present application;

FIG. 12 illustrates a schematic diagram of a timing for receiving a second signaling according to one embodiment of the present application;

FIG. 13 illustrates a structure block diagram of a processor in a first node according to one embodiment of the present application;

FIG. 14 illustrates a structure block diagram of a processor in second node according to one embodiment of the present application.

DESCRIPTION OF THE EMBODIMENTS

Figure 4:
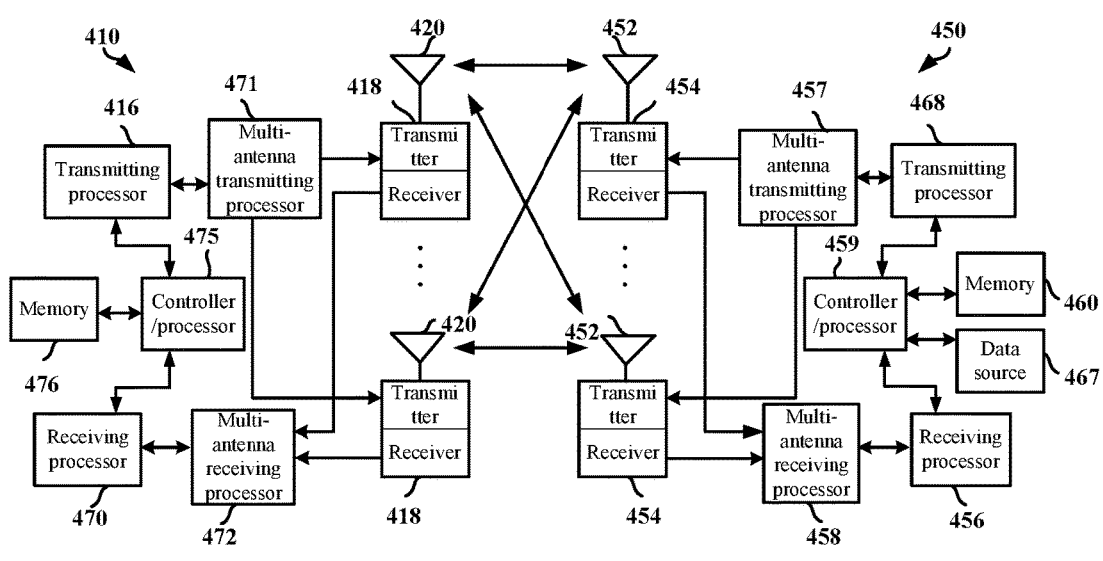
FIG. 4 illustrates a schematic diagram of a first communication device and a second communication device according to one embodiment of the present application.

The technical scheme of the present application is described below in further details in conjunction with the drawings. It should be noted that the embodiments of the present application and the characteristics of the embodiments may be arbitrarily combined if no conflict is caused.

Embodiment 1

Embodiment 1 illustrates a processing flowchart of a first node, as shown in FIG. 1. In step 100 illustrated by FIG. 1, each box represents a step. In embodiment 1, a first node in the present application transmits a first signaling in step 101, the first signaling being used to a first time-frequency resource pool; monitors a second signaling in the first time-frequency resource pool in step 102.

In embodiment 1, the first time-frequency resource pool comprises a first time-frequency resource set and a second time-frequency resource set, and time-frequency resources occupied by the second signaling belong to the first time-frequency resource set or the second time-frequency resource set; the first signaling is used to trigger the second signaling; a first ID is used to generate the second signaling, a first information block is used to generate the second signaling, the first information block is used to determine at least one of a candidate time-frequency resource set or a candidate reference signal resource set; whether the second signaling comprises the first ID is related to whether the first signaling comprises the first ID; when the first signaling comprises the first ID, the second signaling does not comprise the first ID; when the first signaling does not comprise the first ID, the second signaling comprises the first ID; the first ID is a non-negative integer.

In one embodiment, the first signaling is transmitted via an Xn interface.

In one embodiment, the first signaling is transmitted via an X2 interface.

In one embodiment, the first signaling is transmitted via an S1 interface.

In one embodiment, a transmitter of the first signaling is a base station.

In one embodiment, a transmitter of the first signaling is a gNB.

In one embodiment, the first signaling is transmitted through a Backhaul link.

In one embodiment, the first signaling is used to indicate the first time-frequency resource pool.

In one embodiment, the first signaling is used to indicate time-domain resources occupied by the first time-frequency resource pool.

In one embodiment, the first signaling is used to indicate time-domain resources occupied by the first frequency-domain resource pool.

In one embodiment, the first time-frequency resource pool occupies frequency-domain resources corresponding to at least one Resource Block (RB) in frequency domain, and the first time-frequency resource pool occupies more than one slot in time domain.

In one embodiment, the meaning of the phrase of the first signaling being used to determine a first time-frequency resource pool comprises: the second node in the present application transmits a backhaul signaling to the first node, the backhaul signaling is used to indicate the first time-frequency resource pool, and the first signaling is used to determine that the backhaul signaling is correctly received by the first node.

In one embodiment, the first signaling is transmitted in a link other than a radio link.

In one embodiment, the first signaling is transmitted in a wired link.

In one embodiment, a name of the first signaling comprises Request.

In one embodiment, a name of the first signaling comprises Response.

In one embodiment, time-frequency resources comprised in the first time-frequency resource pool supports multiplexing between an interface between gNBs as well as an interface between a gNB and a UE.

In one subembodiment of the above embodiment, an interface between the gNBs comprises an Xn interface.

In one subembodiment of the above embodiment, an interface between the gNBs comprises a radio interface.

In one subembodiment of the above embodiment, an interface between the gNBs comprises an Integrated Access and Backhaul (IAB) interface.

In one subembodiment of the above embodiment, an interface between the gNBs comprises a PC5 interface.

In one subembodiment of the above embodiment, an interface between the gNBs comprises a Uu interface used between base stations.

In one subembodiment of the above embodiment, an interface between the gNB and a UE comprises a Uu interface.

In one embodiment, the monitoring comprises a reception.

In one embodiment, the monitoring comprises a correct reception.

In one embodiment, the monitoring comprises a blind detection.

In one embodiment, the monitoring comprises a demodulation.

In one embodiment, the second signaling comprises a message transmitted on a radio backhaul link.

In one embodiment, the second signaling comprises a physical-layer dynamic signaling.

In one embodiment, the second signaling is transmitted on a radio backhaul link.

In one embodiment, the second signaling is a Medium Access Control (MAC) Control Element (CE).

In one embodiment, a physical-layer channel occupied by the second signaling comprises a Physical Downlink Control Channel (PDCCH).

In one embodiment, a physical-layer channel occupied by the second signaling comprises a Physical Downlink Shared Channel (PDSCH).

In one embodiment, a physical-layer channel occupied by the second signaling comprises a Physical Sidelink Control Channel (PSCCH).

In one embodiment, a physical-layer channel occupied by the second signaling comprises a Physical Sidelink Shared Channel (PSSCH).

In one embodiment, a physical-layer channel occupied by the second signaling comprises a Physical Uplink Control Channel (PUCCH).

In one embodiment, a physical-layer channel occupied by the second signaling comprises a Physical Uplink Shared Channel (PUSCH).

In one embodiment, the first time-frequency resource set occupies frequency-domain resources corresponding to at least one Resource Block (RB), and the first time-frequency resource pool occupies more than one slot in time domain.

In one embodiment, the second time-frequency resource set occupies frequency-domain resources corresponding to at least one Resource Block (RB) in frequency domain, and the first time-frequency resource pool occupies more than one slot in time domain.

In one embodiment, the first time-frequency resource set is used by the first node to receive a radio signal from the second node and receive an uplink signal from a UE served by the first node at the same time.

In one embodiment, the first time-frequency resource set is used by the second node to transmit a radio signal to the first node and receive a transmitted uplink signal from a UE served by the second node at the same time.

In one embodiment, the second time-frequency resource set is used by the second node to transmit a radio signal to the first node and transmit a downlink signal to a UE served by the second node at the same time.

In one embodiment, the second time-frequency resource set is used by the first node to receive a transmitted radio signal from the second node and transmit a downlink signal to a UE served by the second node.

In one embodiment, a multicarrier symbol comprised in the first time-frequency resource set is configured as uplink at the second node.

In one embodiment, a multicarrier symbol comprised in the first time-frequency resource set is configured as Flexible at the second node.

In one embodiment, a multicarrier symbol comprised in the first time-frequency resource set is configured as uplink at the first node.

In one embodiment, a multicarrier symbol comprised in the second time-frequency resource set is configured as downlink at the second node.

In one embodiment, a multicarrier symbol comprised in the second time-frequency resource set is configured as Flexible at the first node.

In one embodiment, a multicarrier symbol comprised in the second time-frequency resource set is configured as downlink at the first node.

In one embodiment, the second signaling is used to respond to the first signaling.

In one embodiment, the second signaling is a confirmation for the first signaling.

In one embodiment, a name of the second signaling comprises Response.

In one embodiment, a name of the second signaling comprises Confirmation.

In one embodiment, the first ID comprises a Physical Cell Identity (PCI).

In one embodiment, the first ID comprises a Radio Network Temporary Identifier (RNTI).

In one embodiment, the first ID is related to both a second ID and a third ID.

In one embodiment, the first ID is linearly related to both a second ID and a third ID.

In one subembodiment of the above two embodiments, the second ID is a PCI, and the third ID is an RNTI.

In one subembodiment of the above two embodiments, the second ID is a non-negative integer, and the third ID is a non-negative integer.

In one subembodiment of the above two embodiments, the second ID is unrelated to the third ID.

In one embodiment, the meaning of the phrase of a first ID being used to generate the second signaling comprises: the first ID is used to scramble the second signaling.

In one embodiment, the meaning of the phrase of a first ID being used to generate the second signaling comprises: the first ID is used to scramble a Cyclic Redundancy Check (CRC) comprised in the second signaling.

In one embodiment, the meaning of the phrase of a first ID being used to generate the second signaling comprises: the first ID is used to scramble a Demodulation Reference Signal (DMRS) comprised in the second signaling.

In one embodiment, the meaning of the phrase of a first ID being used to generate the second signaling comprises: the first ID is used to scramble an information bit carried by the second signaling.

In one embodiment, the meaning of the phrase of a first ID being used to generate the second signaling comprises: the first ID is used to initialize a generator of a scrambling sequence of the second signaling.

In one embodiment, the meaning of the phrase of a first information block being used to generate the second signaling comprises: an information bit carried by the second signaling comprises the first information block.

In one embodiment, the meaning of the phrase of a first information block being used to generate the second signaling comprises: the second signaling is acquired after the first information block is respectively through Cyclic Redundancy Check (CRC) insertion, Low Density Parity Check Code (LDPC) base pattern selection, code block segmentation and code block CRC insertion, channel coding, rate matching, code block connection, scrambling, adjustment, layer mapping, multi-antenna pre-coding and resource mapping.

In one embodiment, the meaning of the phrase of a first information block being used to generate the second signaling comprises: the second signaling is acquired after the first information block is respectively through at least one of CRC insertion, LDPC base pattern selection, code block segmentation and code block CRC insertion, channel coding, rate matching, code block connection, scrambling, adjustment, layer mapping, multi-antenna pre-coding or resource mapping.

In one embodiment, a transport channel occupied by the second signaling comprises a Downlink Shared Channel (DL-SCH).

In one embodiment, the second signaling is generated by a Transport Block (TB).

In one embodiment, the candidate time-frequency resource set comprises more than one multicarrier symbol in time domain, and the candidate time-frequency resource set comprises frequency-domain resources corresponding to at least one RB in frequency domain.

In one embodiment, the candidate time-frequency resource set is used by the first node and the second node for coordinated scheduling.

In one embodiment, the candidate time-frequency resource set is used by the first node and the second node for joint transmission.

In one embodiment, the candidate time-frequency resource set is used by the first node for dynamic scheduling.

In one embodiment, the candidate time-frequency resource set is used by the second node for dynamic scheduling.

In one embodiment, the candidate reference signal resource set comprises K1 reference signal resource(s), K1 being a positive integer.

In one embodiment, the first time-frequency resource pool comprises the candidate reference signal resource set.

In one subembodiment of the above embodiment, K1 is equal to 1.

In one subembodiment of the embodiment, any of the K1 reference signal resource(s) comprises Channel-State Information Reference Signal (CSI-RS) resources.

In one subembodiment of the embodiment, any of the K1 reference signal resource(s) comprises an SS/PBCH Block (SSB).

In one subembodiment of the embodiment, any of the K1 reference signal resource(s) comprises DMRS resources.

In one subembodiment of the embodiment, any of the K1 reference signal resource(s) comprises Sounding Reference Signal (SRS) resources.

In one subembodiment of the embodiment, any of the K1 reference signal resource(s) corresponds to a Transmission Configuration Indication (TCI).

In one subembodiment of the embodiment, any of the K1 reference signal resource(s) corresponds to a TCI-State.

In one subembodiment of the embodiment, any of the K1 reference signal resource(s) corresponds to a TCI-StateId.

In one subembodiment of the embodiment, any of the K1 reference signal resource(s) corresponds to a Sounding Reference Signal Resource Indicator (SRI).

In one subembodiment of the embodiment, any of the K1 reference signal resource(s) corresponds to a Channel State Information Reference Signal Resource Indicator (CRI).

In one subembodiment of the embodiment, an index corresponding to any of the K1 reference signal resource(s) is unique in the first node and the second node.

In one subembodiment of the embodiment, any two of the K1 reference signal resources are different.

In one subembodiment of the embodiment, there does not exist a reference signal resource other than the K1 reference signal resource(s) in the first node adopting a same index as any of the K1 reference signal resource(s).

In one subembodiment of the embodiment, there does not exist a reference signal resource other than the K1 reference signal resource(s) in the second node adopting a same index as any of the K1 reference signal resource(s).

In one subembodiment of the embodiment, an index corresponding to any of the K1 reference signal resource(s) is TCI-StateID.

In one subembodiment of the embodiment, an index corresponding to any of the K1 reference signal resource(s) is a non-negative integer.

In one subembodiment of the embodiment, an index corresponding to at least one of the K1 reference signal resource(s) is csi-IM-ResourceId.

In one subembodiment of the embodiment, an index corresponding to at least one of the K1 reference signal resource(s) is CSI-ResourceConfigId.

In one subembodiment of the embodiment, an index corresponding to at least one of the K1 reference signal resource(s) is SSB-Index.

In one subembodiment of the embodiment, an index corresponding to at least one of the K1 reference signal resource(s) is srs-ResourceSetId.

Embodiment 2

Embodiment 2 illustrates a schematic diagram of a network architecture, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise UE 201, an NR-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present application can be extended to networks providing circuit switching services or other cellular networks. The NR-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 201 corresponds to the second node in the present application.

In one embodiment, the UE 201 corresponds to the third node in the present application.

In one embodiment, the UE 201 supports Unpaired Spectrum scenario.

In one embodiment, the UE 201 supports Flexible Duplex frequency-domain resource configuration.

In one embodiment, the UE 201 supports Full Duplex transmission.

In one embodiment, the UE 201 supports dynamically adjusting uplink and downlink transmission directions.

In one embodiment, the UE 201 supports a beamforming-based reception mode.

In one embodiment, the gNB 203 corresponds to the first node in the present application.

In one embodiment, the gNB 203 corresponds to the second node in the present application.

In one embodiment, the gNB 204 corresponds to the second node in the present application.

In one embodiment, the gNB 203 supports Unpaired Spectrum scenario.

In one embodiment, the gNB 203 supports Flexible Duplex frequency-domain resource configuration.

In one embodiment, the gNB 203 supports Full Duplex transmission.

In one embodiment, the gNB 203 supports dynamically adjusting uplink and downlink transmission directions.

In one embodiment, the gNB 203 supports beamforming-based transmission mode.

In one embodiment, the gNB 204 supports Unpaired Spectrum scenario.

In one embodiment, the gNB 204 supports Flexible Duplex frequency-domain resource configuration.

In one embodiment, the gNB 204 supports Full Duplex transmission.

In one embodiment, the gNB 204 supports dynamically adjusting uplink and downlink transmission directions.

In one embodiment, the gNB 204 supports beamforming-based transmission mode.

Embodiment 3

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X) is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of the link between the first communication node and the second communication node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and also provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the PDCP 304 of the second communication node is used to generate scheduling of the first communication node.

In one embodiment, the PDCP 354 of the second communication node is used to generate scheduling of the first communication node.

In one embodiment, the first signaling is generated by the RRC 306.

In one embodiment, the first signaling is generated by the PDCP 304 or PDCP 354.

In one embodiment, the first signaling is generated by the SDAP 356.

In one embodiment, the first signaling is generated by Non-Access Stratum (NAS).

In one embodiment, the second signaling is generated by the PHY 301 or the PHY 351.

In one embodiment, the second signaling is generated by the MAC 302 or the MAC 352.

In one embodiment, the second signaling is generated by the RRC 306.

In one embodiment, the third signaling is generated by the PHY 301 or the PHY 351.

In one embodiment, the first signal is generated by the PHY 301 or the PHY 351.

In one embodiment, the first signal is generated by the MAC 302 or the MAC 352.

In one embodiment, the first signal is generated by the RRC 306.

In one embodiment, the first node is a terminal.

In one embodiment, the first node is a relay.

In one embodiment, the first node is a base station.

In one embodiment, the first node is a gNB.

In one embodiment, the first node is a Transmitter Receiver Point (TRP).

In one embodiment, the first node is used to manage a plurality of TRPs.

In one embodiment, the first node is a node used to manage multiple cells.

In one embodiment, the first node is a node used to manage multiple carriers.

In one embodiment, the second node is a terminal.

In one embodiment, the second node is an relay.

In one embodiment, the second node is a base station.

In one embodiment, the second node is a gNB.

In one embodiment, the second node is a Transmitter Receiver Point (TRP).

In one embodiment, the second node is used to manage a plurality of TRPs.

In one embodiment, the second node is a node used to manage multiple cells.

In one embodiment, the second node is a node used to manage multiple carriers.

In one embodiment, the third node is a terminal.

In one embodiment, the third node is a relay.

Embodiment 4

Embodiment 4 illustrates a schematic diagram of a first communication device and a second communication device in the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: first transmits a first signaling, the first signaling is used to determine a first time-frequency resource pool; and then monitors a second signaling in the first time-frequency resource pool; the first time-frequency resource pool comprises a first time-frequency resource set and a second time-frequency resource set, and time-frequency resources occupied by the second signaling belong to the first time-frequency resource set or the second time-frequency resource set; the first signaling is used to trigger the second signaling; a first ID is used to generate the second signaling, a first information block is used to generate the second signaling, the first information block is used to determine at least one of a candidate time-frequency resource set or a candidate reference signal resource set; whether the second signaling comprises the first ID is related to whether the first signaling comprises the first ID; when the first signaling comprises the first ID, the second signaling does not comprise the first ID; when the first signaling does not comprise the first ID, the second signaling comprises the first ID; the first ID is a non-negative integer.

In one embodiment, the first communication device 450 comprises at least one processor and at least one memory. a memory that stores a computer readable instruction program. The computer readable instruction program generates an action when executed by at least one processor. The action includes: first transmitting a first signaling, the first signaling being used to determine a first time-frequency resource pool; and then monitoring a second signaling in the first time-frequency resource pool; the first time-frequency resource pool comprises a first time-frequency resource set and a second time-frequency resource set, and time-frequency resources occupied by the second signaling belong to the first time-frequency resource set or the second time-frequency resource set; the first signaling is used to trigger the second signaling; a first ID is used to generate the second signaling, a first information block is used to generate the second signaling, the first information block is used to determine at least one of a candidate time-frequency resource set or a candidate reference signal resource set; whether the second signaling comprises the first ID is related to whether the first signaling comprises the first ID; when the first signaling comprises the first ID, the second signaling does not comprise the first ID; when the first signaling does not comprise the first ID, the second signaling comprises the first ID; the first ID is a non-negative integer.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: first receives a first signaling, the first signaling is used to determine a first time-frequency resource pool; and then transmits a second signaling in the first time-frequency resource pool; the first time-frequency resource pool comprises a first time-frequency resource set and a second time-frequency resource set, and time-frequency resources occupied by the second signaling belong to the first time-frequency resource set or the second time-frequency resource set; the first signaling is used to trigger the second signaling; a first ID is used to generate the second signaling, a first information block is used to generate the second signaling, the first information block is used to determine at least one of a candidate time-frequency resource set or a candidate reference signal resource set; whether the second signaling comprises the first ID is related to whether the first signaling comprises the first ID; when the first signaling comprises the first ID, the second signaling does not comprise the first ID; when the first signaling does not comprise the first ID, the second signaling comprises the first ID; the first ID is a non-negative integer.

In one embodiment, the second communication device 410 comprises a memory that stores a computer readable instruction program. The computer readable instruction program generates an action when executed by at least one processor. The action includes: first receiving a first signaling, the first signaling being used to determine a first time-frequency resource pool; and then transmitting a second signaling in the first time-frequency resource pool; the first time-frequency resource pool comprises a first time-frequency resource set and a second time-frequency resource set, and time-frequency resources occupied by the second signaling belong to the first time-frequency resource set or the second time-frequency resource set; the first signaling is used to trigger the second signaling; a first ID is used to generate the second signaling, a first information block is used to generate the second signaling, the first information block is used to determine at least one of a candidate time-frequency resource set or a candidate reference signal resource set; whether the second signaling comprises the first ID is related to whether the first signaling comprises the first ID; when the first signaling comprises the first ID, the second signaling does not comprise the first ID; when the first signaling does not comprise the first ID, the second signaling comprises the first ID; the first ID is a non-negative integer.

In one embodiment, the first communication device 450 corresponds to a first node in the present application.

In one embodiment, the second communication device 410 corresponds to a second node in the present application.

In one embodiment, the first communication device 450 is a UE.

In one embodiment, the first communication device 450 is a terminal.

In one embodiment, the first communication device 450 is a base station.

In one embodiment, the second communication device 410 is a base station.

In one embodiment, the second communication device 410 is a UE.

In one embodiment, the second communication device 410 is a network device.

In one embodiment, the second communication device 410 is a serving cell.

In one embodiment, the second communication device 410 is a TRP.

In one embodiment, at least first four of the antenna 452, the transmitter 454, the multi-antenna transmitting processor 457, the transmitting processor 468, and the controller/processor 459 are used to transmit a first signaling; at least first four of the antenna 420, the receiver 418, the multi-antenna receiving processor 472, the receiving processor 470 and the controller/processor 475 are used to receive a first signaling.

In one embodiment, at least first four of the antenna 452, the receiver 454, the multi-antenna receiving processor 458, the receiving processor 456 and the controller/processor 459 are used to monitor a second signaling in the first time-frequency resource pool; at least first four of the antenna 420, the transmitter 418, the multi-antenna transmitting processor 471, the transmitting processor 416, and the controller/processor 475 are used to transmit a second signaling in the first time-frequency resource pool.

In one embodiment, at least first four of the antenna 452, the receiver 454, the multi-antenna receiving processor 458, the receiving processor 456 and the controller/processor 459 are used to receive a third signaling; at least first four of the antenna 420, the transmitter 418, the multi-antenna transmitting processor 471, the transmitting processor 416, and the controller/processor 475 are used to transmit a third signaling.

In one embodiment, at least first four of the antenna 452, the transmitter 454, the multi-antenna transmitting processor 457, the transmitting processor 468, and the controller/processor 459 are used to transmit a first signal; at least first four of the antenna 420, the receiver 418, the multi-antenna receiving processor 472, the receiving processor 470 and the controller/processor 475 are used to receive a first signal.

In one embodiment, at least first four of the antenna 452, the receiver 454, the multi-antenna receiving processor 458, the receiving processor 456 and the controller/processor 459 are used to receive a first signal; at least first four of the antenna 420, the transmitter 418, the multi-antenna transmitting processor 471, the transmitting processor 416, and the controller/processor 475 are used to transmit a first signal.

Embodiment 5

Figure 5:
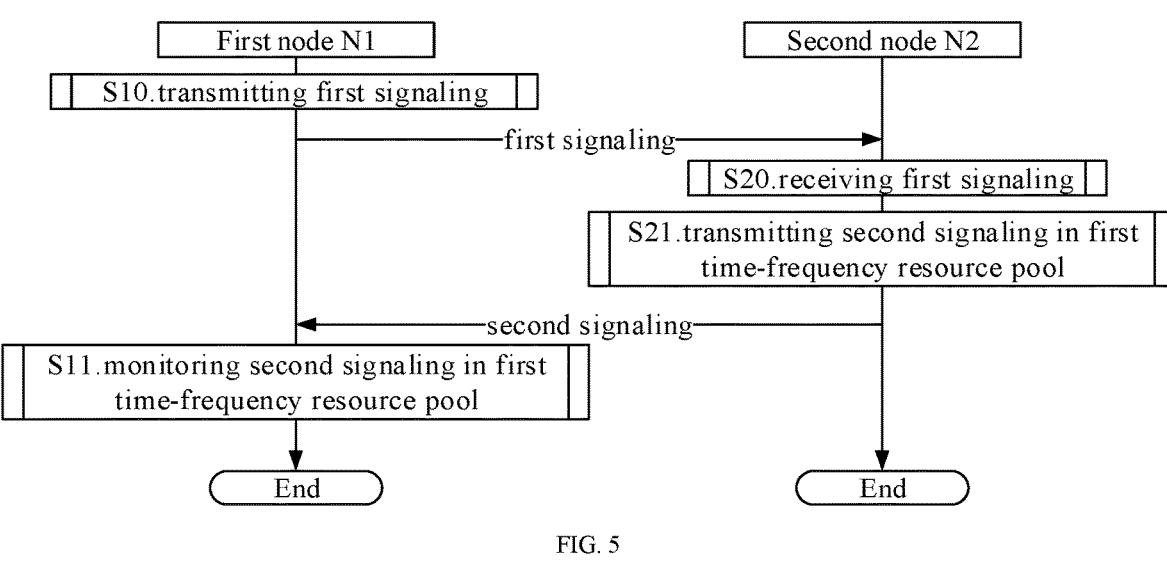
FIG. 5 illustrates a flowchart of a first signaling according to one embodiment of the present application.

Embodiment 5 illustrates a flowchart of a first signaling, as shown in FIG. 5. In FIG. 5, a first node U1 and a second node N2 are in communications via a radio link. It is particularly underlined that the order illustrated in the embodiment does not put constraints over sequences of signal transmissions and implementations. Embodiments, sub-embodiments and subsidiary embodiments of embodiment 5 can be applied to embodiments 6, 7 and 8 if no conflict is incurred, and vice versa, embodiments of embodiments 6, 7 and 8, sub-embodiments and subsidiary embodiments can be applied to embodiment 5 if no conflict is incurred.

The first node N1 transmits a first signaling in step S10; and monitors a second signaling in a first time-frequency resource pool in step S11.

The second node N2 receives a first signaling in step S20; and transmits a second signaling in a first time-frequency resource pool in step S21.

In embodiment 5, the first signaling is used to determine the first time-frequency resource pool; the first time-frequency resource pool comprises a first time-frequency resource set and a second time-frequency resource set, and time-frequency resources occupied by the second signaling belong to the first time-frequency resource set or the second time-frequency resource set; the first signaling is used to trigger the second signaling; a first ID is used to generate the second signaling, a first information block is used to generate the second signaling, the first information block is used to determine at least one of a candidate time-frequency resource set or a candidate reference signal resource set; whether the second signaling comprises the first ID is related to whether the first signaling comprises the first ID; when the first signaling comprises the first ID, the second signaling does not comprise the first ID; when the first signaling does not comprise the first ID, the second signaling comprises the first ID; the first ID is a non-negative integer.

In one embodiment, when the first signaling comprises the first ID, time-frequency resources occupied by the second signaling belong to the first time-frequency resource set; when the first signaling does not comprise the first ID, time-frequency resources occupied by the second signaling belong to the second time-frequency resource set.

In one embodiment, REs occupied by the first time-frequency resource set are orthogonal to REs occupied by the second time-frequency resource set.

In one embodiment, when the first signaling comprises the first ID, the first node is used to generate the first ID.

In one subembodiment of the above embodiment, the first ID comprises a PCI of the first node.

In one subembodiment of the above embodiment, the first ID comprises a Cell Radio Network Temporary Identifier (C-RNTI) configured by the first node and not used for a UE served by the first node.

In one subembodiment of the above embodiment, the first ID comprises an RNTI configured by the first node.

In one subembodiment of the above embodiment, the first ID comprises an Xn-RNTI configured by the first node.

In one embodiment, when the first signaling does not comprise the first ID, the second node is used to generate the first ID.

In one subembodiment of the above embodiment, the first ID comprises a PCI of the second node.

In one subembodiment of the above embodiment, the first ID comprises a C-RNTI configured by the second node and not used for a UE served by the second node.

In one subembodiment of the above embodiment, the first ID comprises an RNTI configured by the second node.

In one subembodiment of the above embodiment, the first ID comprises an Xn-RNTI configured by the second node.

In one embodiment, the first signaling and the second signaling are respectively transmitted via different interfaces.

In one subembodiment of the above embodiment, the meaning of the above phrase of the first signaling and the second signaling being respectively transmitted via different interfaces comprises: the first signaling is transmitted via an Xn interface, and the second signaling is transmitted via an air interface.

In one subembodiment of the above embodiment, the meaning of the above phrase of the first signaling and the second signaling being respectively transmitted via different interfaces comprises: the first signaling is transmitted via an Xn interface, and the second signaling is transmitted via a Uu interface used between two gNBs.

In one subembodiment of the above embodiment, the meaning of the above phrase of the first signaling and the second signaling being respectively transmitted via different interfaces comprises: the first signaling is transmitted via an interface corresponding to backhaul, and the second signaling is transmitted via an interface corresponding to an access link.

In one subembodiment of the above embodiment, the meaning of the above phrase of the first signaling and the second signaling being respectively transmitted via different interfaces comprises: the first signaling is transmitted through a wired interface, and the second signaling is transmitted through a radio interface.

In one subembodiment of the above embodiment, the meaning of the above phrase of the first signaling and the second signaling being respectively transmitted via different interfaces comprises: a transmission of the first signaling and a transmission of the second signaling are respectively based on different protocol architectures.

In one embodiment, when the first signaling comprises the first ID, a slot format corresponding to the first time-frequency resource set for the first node is uplink; when the first signaling comprises the first ID, a slot format corresponding to the second time-frequency resource set for the first node is flexible.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multi-carrier symbol is a Filter Bank Multi-Carrier (FBMC) symbol.

In one embodiment, the multicarrier symbol comprises a Cyclic Prefix (CP).

In one embodiment, the slot format in the present application represents a transmission direction of a corresponding multicarrier symbol.

In one embodiment, the slot format of the present application is one of Downlink, Uplink or Flexible.

In one embodiment, when the first signaling comprises the first ID, the second node is as a UE, the first node is as a base station, and the first node and the second node are in communications according to protocol of Uu interface.

In one embodiment, when the first signaling comprises the first ID, the second node is as a base station, the first node is as a UE, and the first node and the second node are in communications according to protocol of Uu interface.

In one embodiment, the first ID is a physical cell ID, or the first ID is an RNTI, or the first ID is related to both a physical cell ID and an RNTI.

In one subembodiment of the above embodiment, the first ID is related to both a physical cell ID and an RNTI, the first ID is linearly correlated with the physical cell ID, and the first ID is linearly correlated with the RNTI.

In one subembodiment of the above embodiment, when the first ID is related to both a physical cell ID and an RNTI, a linear correlation of the first physical cell ID and a linear correlation of the RNTI are used together to generate the first ID.

In one embodiment, a timing for transmitting the second signaling is a target timing; a downlink timing of a transmitter of the second signaling is a first timing, and an uplink receiving timing for the first node is a second timing; when the first signaling does not comprise the first ID, the target timing is the first timing; when the first signaling comprises the first ID, the target timing is the second timing.

In one subembodiment of the embodiment, the meaning of the above phrase of the target timing being the first timing comprises: a subframe occupied by the second signaling is synchronized with a downlink subframe of the second node.

In one subembodiment of the embodiment, the meaning of the above phrase of the target timing being the first timing comprises: a subframe occupied by the second signaling is aligned with a downlink subframe of the second node in time domain.

In one subembodiment of the embodiment, the meaning of the above phrase of the target timing being the first timing comprises: a slot occupied by the second signaling is synchronized with a downlink slot of the second node.

In one subembodiment of the embodiment, the meaning of the above phrase of the target timing being the first timing comprises: a slot occupied by the second signaling is aligned with a downlink slot of the second node in time domain.

In one subembodiment of the embodiment, the meaning of the above phrase of the target timing being the first timing comprises: a multicarrier symbol occupied by the second signaling is synchronized with a downlink multicarrier symbol of the second node.

In one subembodiment of the embodiment, the meaning of the above phrase of the target timing being the first timing comprises: a multicarrier symbol occupied by the second signaling is aligned with a downlink multicarrier symbol of the second node in time domain.

In one subembodiment of the embodiment, the meaning of the above phrase of the target timing being the first timing comprises: at least one of a PSS or an SSS transmitted by the second node is used to determine a timing for receiving the second signaling.

In one subembodiment of the embodiment, the meaning of the above phrase of the target timing being the first timing comprises: a downlink signal transmitted by the second node is used to determine a timing for receiving the second signaling.

In one subembodiment of the embodiment, the meaning of the above phrase of the target timing being the second timing comprises: a subframe occupied by the second signaling is synchronized with an uplink subframe of the first node.

In one subembodiment of the embodiment, the meaning of the above phrase of the target timing being the second timing comprises: a subframe occupied by the second signaling is aligned with an uplink subframe of the first node in time domain.

In one subembodiment of the embodiment, the meaning of the above phrase of the target timing being the second timing comprises: a slot occupied by the second signaling is synchronized with an uplink slot of the first node.

In one subembodiment of the embodiment, the meaning of the above phrase of the target timing being the second timing comprises: a slot occupied by the second signaling is aligned with an uplink slot of the first node in time domain.

In one subembodiment of the embodiment, the meaning of the above phrase of the target timing being the second timing comprises: a multicarrier symbol occupied by the second signaling is synchronized with an uplink multicarrier symbol of the first node.

In one subembodiment of the embodiment, the meaning of the above phrase of the target timing being the second timing comprises: a multicarrier symbol occupied by the second signaling is aligned with an uplink multicarrier symbol of the first node in time domain.

In one subembodiment of the embodiment, the meaning of the above phrase of the target timing being the second timing comprises: an uplink signal received by the first node is used to determine a timing for receiving the second signaling.

In one subembodiment of the embodiment, the meaning of the above phrase of the target timing being the second timing comprises: a timing acquired after subtracting a timing offset from a downlink transmission timing of the first node is used to determine a timing for receiving the second signaling, and the timing offset is related to a distance between the first node and the second node.

In one subsidiary embodiment of the subembodiment, the timing offset is equal to twice a transmission delay via a radio interface between the second node and the first node.

Embodiment 6

Figure 6:
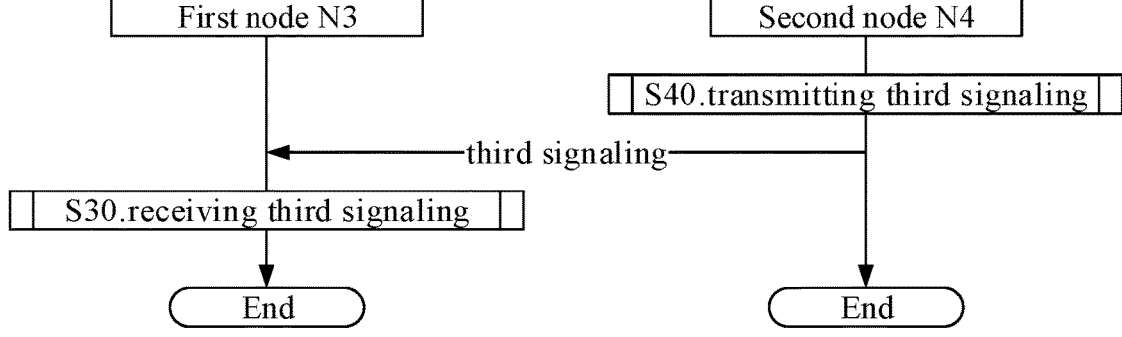
FIG. 6 illustrates a flowchart of a third signaling according to one embodiment of the present application.

Embodiment 6 illustrates a flowchart of a third signaling, as shown in FIG. 6. In FIG. 6, a first node N3 and a second node N4 are in communication via a radio link. It is particularly underlined that the order illustrated in the embodiment does not put constraints over sequences of signal transmissions and implementations. Embodiments, sub-embodiments and subsidiary embodiments of embodiment 6 can be applied to embodiment 5, 7 and 8 if no conflict is incurred, and vice versa, embodiments of embodiments 5, 7 and 8, sub-embodiments and subsidiary embodiments can be applied to embodiment 6 if no conflict is incurred.

The first node N3 receives a third signaling in step S30.

The second node N4 transmits a third signaling in step S40.

In embodiment 6, the third signaling is used to indicate a first time-frequency resource block, and the second signaling occupies the first time-frequency resource block; a CRC comprised in the third signaling is scrambled through the first ID; the third signaling is a physical-layer dynamic signaling.

In one embodiment, the third signaling is Downlink Control Information (DCI).

In one embodiment, the third signaling is used to schedule the second signaling.

In one embodiment, the third signaling is Sidelink control information (SCI).

In one embodiment, a physical-layer channel occupied by the third signaling comprises a PDCCH.

In one embodiment, a physical-layer channel occupied by the third signaling comprises a PSCCH.

In one embodiment, the third signaling is used to indicate time-domain resources occupied by the first time-frequency resource block.

In one embodiment, the third signaling is used to indicate frequency-domain resources occupied by the first time-frequency resource block.

In one embodiment, the third signaling is used to indicate time-frequency resources occupied by the first time-frequency resource block.

In one embodiment, the first time-frequency resource block occupies frequency-domain resources corresponding to at least one RB in frequency domain, and the first time-frequency resource block occupies time-domain resources corresponding to at least one multicarrier symbol in time domain.

In one embodiment, the step S30 is taken after the step S10 and before the step S11 in embodiment 5.

In one embodiment, the step S40 is taken after the step S20 and before the step S21 in embodiment 5.

Embodiment 7

Figures 7, 8, 9, 10:
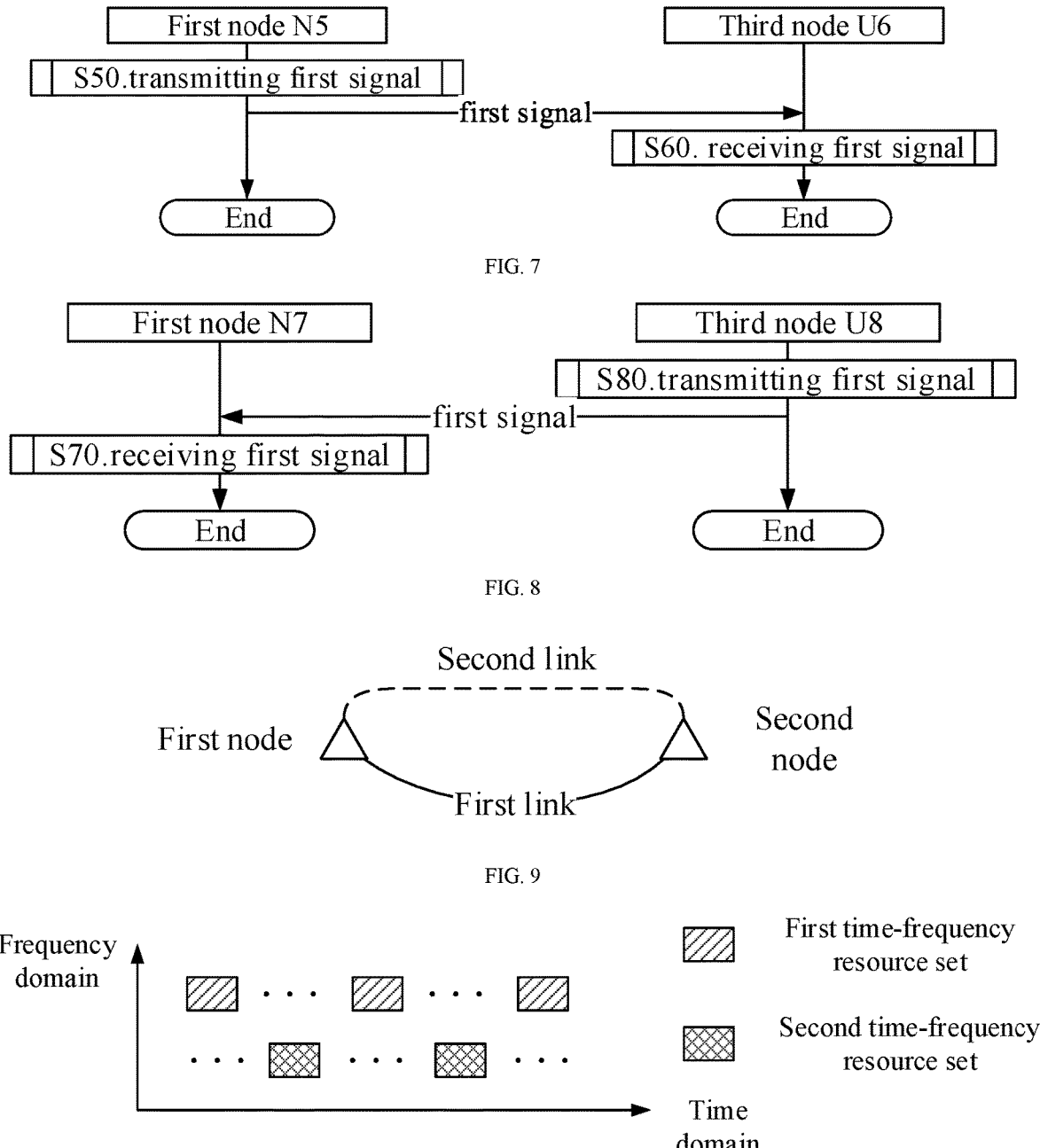
FIG. 7 illustrates a flowchart of a first signal according to one embodiment of the present application.
FIG. 8 illustrates a flowchart of a first signal according to another embodiment of the present application.
FIG. 9 illustrates a schematic diagram of an application scenario according to one embodiment of the present application.
FIG. 10 illustrates a schematic diagram of a first time-frequency resource set and a second time-frequency resource set according to one embodiment of the present application.

Embodiment 7 illustrates a flowchart of a first signal, as shown in FIG. 7. In FIG. 7, a first node N5 and a third node U6 are in communications via a radio link. It is particularly underlined that the order illustrated in the embodiment does not put constraints over sequences of signal transmissions and implementations. Embodiments, sub-embodiments and subsidiary embodiments of embodiment 7 can be applied to embodiment 5, 6 and 8 if no conflict is incurred, and vice versa, embodiments, sub-embodiments and subsidiary embodiments of embodiments 5, 6 and 8 can be applied to embodiment 7 if no conflict is incurred.

The first node N5 transmits a first signal in step S50.

The third node U6 receives a first signal in step S60.

In embodiment 7, there exists an overlapping in time-domain resources occupied by the first signal and time-domain resources occupied by the second signaling; the second signaling and the first signal are respectively transmitted via different interfaces.

In one embodiment, the first signal and the second signaling are non-QCL.

In one embodiment, the first signal is transmitted via an air interface.

In one embodiment, the first signal is transmitted via a Uu interface.

In one embodiment, the third node is a given UE.

In one subembodiment of the embodiment, a physical-layer channel occupied by the first signal comprises a PDSCH.

In one subembodiment of the embodiment, a physical-layer channel occupied by the first signal comprises a PDCCH.

In one embodiment, the given UE is provided services by the first node.

In one embodiment, there exist an overlapping in time-frequency resources occupied by the first signal and time-frequency resources occupied by the second signaling.

In one embodiment, the first signal and the second signaling are SDM.

In one embodiment, the QCL refers to Quasi Co-Located.

In one embodiment, the QCL refers to Quasi Co-Location.

In one embodiment, the QCL comprises a QCL parameter.

In one embodiment, the QCL comprises a QCL assumption.

In one embodiment, a type of the QCL comprises QCL-TypeA.

In one embodiment, a type of the QCL comprises QCL-TypeB.

In one embodiment, a type of the QCL comprises QCL-TypeC.

In one embodiment, a type of the QCL comprises QCL-TypeD.

In one embodiment, the step S50 and the step S11 in embodiment 5 are performed at the same time.

In one embodiment, the third node is a UE served by the first node.

In one embodiment, the third node and the second node are non-QCL.

Embodiment 8

Embodiment 8 illustrates another flowchart of a first signal, as shown in FIG. 8. In FIG. 8, a first node N7 and a third node U8 are in communications via a radio link. It is particularly underlined that the order illustrated in the embodiment does not put constraints over sequences of signal transmissions and implementations. Embodiments, sub-embodiments and subsidiary embodiments of embodiment 8 can be applied to embodiments 5, 6 and 7 if no conflict is incurred, and vice versa, embodiments, sub-embodiments and subsidiary embodiments of embodiments 5, 6 and 7 can be applied to embodiment 8 if no conflict is incurred.

The first node N7 receives a first signal in step S70.

The third node U8 transmits a first signal in step S80.

In embodiment 8, there exists an overlapping in time-domain resources occupied by the first signal and time-domain resources occupied by the second signaling; the second signaling and the first signal are respectively transmitted via different interfaces.

In one embodiment, the first signal and the second signaling are non-QCL.

In one embodiment, the first signal is transmitted via an air interface.

In one embodiment, the first signal is transmitted via a Uu interface.

In one embodiment, the third node is a given UE.

In one subembodiment of the embodiment, a physical-layer channel occupied by the first signal comprises a PUSCH.

In one subembodiment of the embodiment, a physical-layer channel occupied by the first signal comprises a PUCCH.

In one embodiment, the given UE is provided services by the first node.

In one embodiment, time-frequency resources occupied by the first signal and time-frequency resources occupied by the second signaling are orthogonal.

In one embodiment, the first signal and the second signaling are FDM.

In one embodiment, the step S70 and the step S11 in embodiment 5 are performed at the same time.

In one embodiment, the third node is a UE served by the first node.

In one embodiment, the third node and the second node are non-QCL.

Embodiment 9

Embodiment 9 illustrates a schematic diagram of an application scenario, as shown in FIG. 9. In FIG. 9, the first node and the second node are respectively two communication nodes, the first node and the second node are connected via a first link, and the first node and the second node perform radio transmissions via a second link; the first signaling is transmitted on the first link, and the second signaling is transmitted on the second link.

In one embodiment, the first node is a gNB.

In one embodiment, the second node is a gNB.

In one embodiment, the first link is not a radio link.

In one embodiment, the first link is a backhaul link.

In one embodiment, the first link is an Xn link.

In one embodiment, the first link is a wired link.

In one embodiment, the second link is a radio link.

In one embodiment, the second link is an air interface link.

In one embodiment, the second link is a Uu link.

In one embodiment, the second link is a PC5 link.

In one embodiment, the second link is a Un link.

In one embodiment, the first link adopts a protocol stack of a backhaul link.

In one embodiment, the second link adopts a protocol stack of a Uu link.

In one embodiment, the second link adopts a protocol stack adopted for communications between terminals in V2X.

In one embodiment, the second link adopts a protocol stack adopted for communications between a base station and a relay.

Embodiment 10

Embodiment 10 illustrates a schematic diagram of a first time-frequency resource set and a second time-frequency resource set, as shown in FIG. 10. In FIG. 10, the first time-frequency resource set or the second time-frequency resource set are orthogonal.

In one embodiment, the first time-frequency resource set is configured through an RRC signaling.

In one embodiment, the first time-frequency resource set is configured through a higher-layer signaling.

In one embodiment, the first time-frequency resource set is periodically configured.

In one embodiment, the second time-frequency resource set is configured through an RRC signaling.

In one embodiment, the second time-frequency resource set is configured through a higher-layer signaling.

In one embodiment, the second time-frequency resource set is periodically configured.

In one embodiment, the first time-frequency resource set is configured as resources used for uplink transmission.

In one embodiment, the second time-frequency resource set is configured at the first node as time-frequency resources supporting Flexible Duplex.

In one embodiment, the second time-frequency resource set is configured at the first node as time-frequency resources supporting Full Duplex transmission.

In one embodiment, the second time-frequency resource set is configured at the first node as time-frequency resources supporting dynamically adjusting uplink and downlink transmission directions.

Embodiment 11

Embodiment 11 illustrates a schematic diagram of a timing for transmitting a second signaling, as shown in FIG. 11. The first row shown in the figure corresponds to a timing of the second node itself, the second row corresponds to a downlink timing of UE in a second node, and the first node in the third row determines a timing for receiving a second signaling according to a downlink from the second node to the first node; T1 shown in the figure represents a transmission delay from the second node to UE; T2 shown in the figure represents a transmission delay from the second node to the first node. In the figure, the number in the rectangle represents a slot, and the second signaling in the present application is transmitted in slot #0.

In one embodiment, a timing of the second node itself is the first timing in the present application.

In one embodiment, T1 is measured by ms.

In one embodiment, T2 is measured by ms.

In one embodiment, the timing for transmitting the second signaling illustrated in embodiment 11 is for a scenario where the first signaling does not comprise the first ID.

Embodiment 12

Embodiment 12 illustrates a schematic diagram of a timing for receiving the second signaling, as shown in FIG. 12. The first row shown in the figure corresponds to a timing of the first node itself, the second row corresponds to an uplink timing of UE in a first node, and the second node in the third row transmits a second signaling according to an uplink timing of the first node; T3 in the figure represents a Timing Advance (TA) from the UE to the first node; T4 shown in the figure represents a TA from the second node to the first node. In the figure, the number in the rectangle represents a slot, and the second signaling in the present application is transmitted in slot #0.

In one embodiment, a timing of the first node itself is the second timing in the present application.

In one embodiment, T3 is measured by ms.

In one embodiment, T4 is measured by ms.

In one embodiment, the timing for transmitting the second signaling illustrated in embodiment 12 is for a scenario where the first signaling comprises the first ID.

Embodiment 13

Embodiment 13 illustrates a structure block diagram in a first node, as shown in FIG. 13. In FIG. 13, a first node 1300 comprises a first transmitter 1301 and a first transceiver 1302.

The first transmitter 1301 transmits a first signaling, and the first signaling is used to determine a first time-frequency resource pool;

the first transceiver 1302 monitors a second signaling in the first time-frequency resource pool;

In embodiment 13, the first time-frequency resource pool comprises a first time-frequency resource set and a second time-frequency resource set, and time-frequency resources occupied by the second signaling belong to the first time-frequency resource set or the second time-frequency resource set; the first signaling is used to trigger the second signaling; a first ID is used to generate the second signaling, a first information block is used to generate the second signaling, the first information block is used to determine at least one of a candidate time-frequency resource set or a candidate reference signal resource set; whether the second signaling comprises the first ID is related to whether the first signaling comprises the first ID; when the first signaling comprises the first ID, the second signaling does not comprise the first ID; when the first signaling does not comprise the first ID, the second signaling comprises the first ID; the first ID is a non-negative integer.

In one embodiment; when the first signaling comprises the first ID, time-frequency resources occupied by the second signaling belong to the first time-frequency resource set; when the first signaling does not comprise the first ID, time-frequency resources occupied by the second signaling belong to the second time-frequency resource set.

In one embodiment; the first signaling and the second signaling are respectively transmitted via different interfaces.

In one embodiment; when the first signaling comprises the first ID, a slot format corresponding to the first time-frequency resource set for the first node is uplink; when the first signaling does not comprise the first ID, a slot format corresponding to the second time-frequency resource set for the first node is flexible.

In one embodiment, the first ID is a physical cell ID, or the first ID is an RNTI, or the first ID is related to both a physical cell ID and an RNTI.

In one embodiment, the first transceiver 1302 receives a third signaling, the third signaling is used to indicate a first time-frequency resource block, and the second signaling occupies the first time-frequency resource block; a CRC comprised in the third signaling is scrambled through the first ID; the third signaling is a physical-layer dynamic signaling.

In one embodiment, a timing for transmitting the second signaling is a target timing; a downlink timing of a transmitter of the second signaling is a first timing, and an uplink receiving timing for the first node is a second timing; when the first signaling does not comprise the first ID, the target timing is the first timing; when the first signaling comprises the first ID, the target timing is the second timing.

In one embodiment, the first transceiver 1302 transmits a first signal; there exists an overlapping in time-domain resources occupied by the first signal and time-domain resources occupied by the second signaling; the second signaling and the first signal are respectively transmitted via different interfaces.

In one embodiment, the first transceiver 1302 receives a first signal; there exists an overlapping in time-domain resources occupied by the first signal and time-domain resources occupied by the second signaling; the second signaling and the first signal are respectively transmitted via different interfaces.

In one embodiment, the first transmitter 1301 comprises at least the first four of the antenna 452, the transmitter 454, the multi-antenna transmitting processor 457, the transmitting processor 468 and the controller/processor 459 in embodiment 4.

In one embodiment, the first transceiver 1302 comprises at least first six of the antenna 452, the receiver/transmitter 454, the multi-antenna receiving processor 458, the multi-antenna transmitting processor 457, the receiving processor 456, the transmitting processor 468, and the controller/processor 459 in embodiment 4.

In one embodiment, the first transmitter 1301 comprises at least first four of the antenna 420, the transmitter 418, the multi-antenna transmitting processor 471, the transmitting processor 414 and the controller/processor 475 in embodiment 4.

In one embodiment, the first transceiver 1302 comprises at least first six of the antenna 420, the transmitter/receiver 418, the multi-antenna transmitting processor 471, the multi-antenna receiving processor 472, the transmitting processor 416, the receiving processor 470, and the controller/processor 475 in embodiment 4.

Embodiment 14

Embodiment 14 illustrates a structure block diagram of in a second node, as shown in FIG. 14. In FIG. 14, a second node 1400 comprises a first receiver 1401 and a second transceiver 1402.

The first receiver 1401 receives a first signaling, the first signaling is used to determine a first time-frequency resource pool;

the second transceiver 1402 transmits a second signaling in the first time-frequency resource pool;

In embodiment 14, the first time-frequency resource pool comprises a first time-frequency resource set and a second time-frequency resource set, and time-frequency resources occupied by the second signaling belong to the first time-frequency resource set or the second time-frequency resource set; the first signaling is used to trigger the second signaling; a first ID is used to generate the second signaling, a first information block is used to generate the second signaling, the first information block is used to determine at least one of a candidate time-frequency resource set or a candidate reference signal resource set; whether the second signaling comprises the first ID is related to whether the first signaling comprises the first ID; when the first signaling comprises the first ID, the second signaling does not comprise the first ID; when the first signaling does not comprise the first ID, the second signaling comprises the first ID; the first ID is a non-negative integer.

In one embodiment; when the first signaling comprises the first ID, time-frequency resources occupied by the second signaling belong to the first time-frequency resource set; when the first signaling does not comprise the first ID, time-frequency resources occupied by the second signaling belong to the second time-frequency resource set.

In one embodiment; the first signaling and the second signaling are respectively transmitted via different interfaces.

In one embodiment; when the first signaling comprises the first ID, a slot format corresponding to the first time-frequency resource set for the first node is uplink; when the first signaling does not comprise the first ID, a slot format corresponding to the second time-frequency resource set for the first node is flexible.

In one embodiment, the first ID is a physical cell ID, or the first ID is an RNTI, or the first ID is related to both a physical cell ID and an RNTI.

In one embodiment, the second transceiver 1402 transmits a third signaling, the third signaling is used to indicate a first time-frequency resource block, and the second signaling occupies the first time-frequency resource block; a CRC comprised in the third signaling is scrambled through the first ID; the third signaling is a physical-layer dynamic signaling.

In one embodiment, a timing for transmitting the second signaling is a target timing; a downlink timing of a transmitter of the second signaling is a first timing, and an uplink receiving timing for the first node is a second timing; when the first signaling does not comprise the first ID, the target timing is the first timing; when the first signaling comprises the first ID, the target timing is the second timing.

In one embodiment, the second transceiver 1402 receives a first signal; there exists an overlapping in time-domain resources occupied by the first signal and time-domain resources occupied by the second signaling; the second signaling and the first signal are respectively transmitted via different interfaces.

In one embodiment, the second transceiver 1402 transmits a first signal; there exists an overlapping in time-domain resources occupied by the first signal and time-domain resources occupied by the second signaling; the second signaling and the first signal are respectively transmitted via different interfaces.

In one embodiment, the first receiver 1401 comprises at least first four of the antenna 452, the receiver 454, the multi-antenna receiving processor 458, the receiving processor 456 and the controller/processor 459 in embodiment 4.

In one embodiment, the second transceiver 1402 comprises at least first six of the antenna 452, the receiver/transmitter 454, the multi-antenna receiving processor 458, the multi-antenna transmitting processor 457, the receiving processor 456, the transmitting processor 468, and the controller/processor 459 in embodiment 4.

In one embodiment, the first receiver 1401 comprises at least the first four of the antenna 420, the receiver 418, the multi-antenna receiving processor 472, the receiving processor 470 and the controller/processor 475 in embodiment 4.

In one embodiment, the second transceiver 1402 comprises at least first six of the antenna 420, the transmitter/receiver 418, the multi-antenna transmitting processor 471, the multi-antenna receiving processor 472, the transmitting processor 416, the receiving processor 470, and the controller/processor 475 in embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present application includes but is not limited to mobile phones, tablet computers, notebooks, network cards, low-consumption equipment, enhanced MTC (eMTC) terminals, NB-IOT terminals, vehicle-mounted communication equipment, vehicles, cars, RSUs, aircrafts, diminutive airplanes, unmanned aerial vehicles, telecontrolled aircrafts and other wireless communication devices. The second node in the present application includes but is not limited to macro-cellular base stations, femtocell, micro-cellular base stations, home base stations, relay base station, eNB, gNB, Transmitter Receiver Point (TRP), GNSS, relay satellites, satellite base stations, space base stations, RSUs, Unmanned Aerial Vehicle (UAV), test devices, for example, a transceiver or a signaling tester simulating some functions of a base station and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node for wireless communications, the first node comprising:

a transceiver; and a processor, wherein the transceiver and the processor are configured to:

transmit a first signaling, wherein the first signaling being used to determine a first time-frequency resource pool; and monitor a second signaling in the first time-frequency resource pool, wherein the first time-frequency resource pool comprises a first time-frequency resource set and a second time-frequency resource set, and time-frequency resources occupied by the second signaling belong to the first time-frequency resource set or the second time-frequency resource set, and wherein the first signaling is used to trigger the second signaling, and wherein a first identity (ID) is used to generate the second signaling, a first information block is used to generate the second signaling, the first information block is used to determine at least one of a candidate time-frequency resource set or a candidate reference signal resource set, and wherein whether the second signaling comprises the first ID is related to whether the first signaling comprises the first ID, and wherein on a condition that the first signaling comprises the first ID, the second signaling does not comprise the first ID, and wherein on a condition that the first signaling does not comprise the first ID, the second signaling comprises the first ID, and wherein the first ID is a non-negative integer.

2. The first node according to claim 1, wherein on a condition that the first signaling comprises the first ID, time-frequency resources occupied by the second signaling belong to the first time-frequency resource set, and wherein on a condition that the first signaling does not comprise the first ID, time-frequency resources occupied by the second signaling belong to the second time-frequency resource set.

3. The first node according to claim 1, wherein the first signaling and the second signaling are respectively transmitted via different interfaces.

4. The first node according to claim 1, wherein on a condition that the first signaling comprises the first ID, a slot format corresponding to the first time-frequency resource set for the first node is uplink, and wherein on a condition the first signaling does not comprise the first ID, a slot format corresponding to the second time-frequency resource set for the first node is flexible.

5. The first node according to claim 1, wherein the first ID is a physical cell ID, or the first ID is a Radio Network Temporary Identifier (RNTI), or the first ID is related to both a physical cell ID and an RNTI.

6. The first node according to claim 1, wherein the transceiver and the processor are further configured to:
  receives a third signaling, wherein the third signaling is used to indicate a first time-frequency resource block, and the second signaling occupies the first time-frequency resource block, and
  wherein a CRC comprised in the third signaling is scrambled through the first ID, and
  wherein the third signaling is a physical-layer dynamic signaling.

7. The first node according to claim 1, wherein a timing for transmitting the second signaling is a target timing, and
  wherein a downlink timing of a transmitter of the second signaling is a first timing, and an uplink receiving timing for the first node is a second timing, and
  wherein on a condition that the first signaling does not comprise the first ID, the target timing is the first timing, and
  wherein on a condition that the first signaling comprises the first ID, the target timing is the second timing.

8. The first node according to claim 1, wherein the first transceiver and the processor are further configured to:
  operate a first signal, and
  wherein there exists an overlapping in time-domain resources occupied by the first signal and time-domain resources occupied by the second signaling, and
  wherein the second signaling and the first signal are respectively transmitted via different interfaces, and
  wherein the operating action is transmitting, or the operating action is receiving.

9. The first node according to claim 1, wherein the meaning of the phrase of the first signaling being used to determine a first time-frequency resource pool comprises: a transmitter of the second signaling transmits a backhaul signaling to the first node, the backhaul signaling is used to indicate the first time-frequency resource pool, and the first signaling is used to determine that the backhaul signaling is correctly received by the first node.

10. The first node according to claim 1, wherein the candidate time-frequency resource set comprises more than one multicarrier symbol in time domain, and the candidate time-frequency resource set comprises frequency-domain resources corresponding to at least one RB in frequency domain, and
  wherein the candidate time-frequency resource set is used for at least one of the following:
  coordinated scheduling of the first node and a transmitter of the second signaling,
  joint transmission of the first node and a transmitter of the second signaling,
  dynamic scheduling of the first node, and
  dynamic scheduling of a transmitter of the second signaling.

11. The first node according to claim 1, wherein the candidate reference signal resource set comprises K1 reference signal resource, K1 being a positive integer, and
  wherein any of the K1 reference signal resource corresponds to a TCI-State.

12. A second node for wireless communications, the second node comprising:
  a transceiver; and
  a processor, wherein the transceiver and the processor are configured to:
  receive a first signaling, the first signaling being used to determine a first time-frequency resource pool, and
  transmit a second signaling in the first time-frequency resource pool, wherein the first time-frequency resource pool comprises a first time-frequency resource set and a second time-frequency resource set, and time-frequency resources occupied by the second signaling belong to the first time-frequency resource set or the second time-frequency resource set, and
  wherein the first signaling is used to trigger the second signaling, and
  wherein a first ID is used to generate the second signaling, a first information block is used to generate the second signaling, the first information block is used to determine at least one of a candidate time-frequency resource set or a candidate reference signal resource set, and
  wherein whether the second signaling comprises the first ID is related to whether the first signaling comprises the first ID, and
  wherein on a condition that the first signaling comprises the first ID, the second signaling does not comprise the first ID,
  wherein on a condition that the first signaling does not comprise the first ID, the second signaling comprises the first ID, and
  wherein the first ID is a non-negative integer.

13. The second node according to claim 12, wherein when on a condition that the first signaling comprises the first ID, time-frequency resources occupied by the second signaling belong to the first time-frequency resource set, and
  wherein on a condition the first signaling does not comprise the first ID, time-frequency resources occupied by the second signaling belong to the second time-frequency resource set.

14. The second node according to claim 12, wherein the first signaling and the second signaling are respectively transmitted via different interfaces.

15. The second node according to claim 12, wherein on a condition that the first signaling comprises the first ID, a slot format corresponding to the first time-frequency resource set for a transmitter of the first signaling is uplink, and
  wherein on a condition that the first signaling does not comprise the first ID, a slot format corresponding to the second time-frequency resource set for a transmitter of the first signaling is flexible.

16. The second node according to claim 12, wherein the first ID is a physical cell ID, or the first ID is an RNTI, or the first ID is related to both a physical cell ID and an RNTI.

17. The second node according to claim 12, wherein the transceiver and the processor are further configured to:
  transmits a third signaling, wherein the third signaling is used to indicate a first time-frequency resource block, and the second signaling occupies the first time-frequency resource block, and
  wherein a CRC comprised in the third signaling is scrambled through the first ID; the third signaling is a physical-layer dynamic signaling.

18. The second node according to claim 12, wherein a timing for transmitting the second signaling is a target timing, and wherein a downlink timing of the second node is a first timing, and an uplink reception timing of a transmitter of the first signaling is a second timing; and wherein on a condition that the first signaling does not comprise the first ID, the target timing is the first timing, and wherein on a condition that the first signaling comprises the first ID, the target timing is the second timing.

19. The second node according to claim 12, wherein the transceiver and the processor are further configured to:

execute a first signal, and wherein there exists an overlapping in time-domain resources occupied by the first signal and time-domain resources occupied by the second signaling, and wherein the second signaling and the first signal are respectively transmitted via different interfaces; the executing action is receiving, or, the executing action is transmitting.

20. A method in a first node for wireless communications, comprising:

transmitting a first signaling, the first signaling being used to determine a first time-frequency resource pool; and monitoring a second signaling in the first time-frequency resource pool;, wherein the first time-frequency resource pool comprises a first time-frequency resource set and a second time-frequency resource set, and time-frequency resources occupied by the second signaling belong to the first time-frequency resource set or the second time-frequency resource set, and wherein the first signaling is used to trigger the second signaling, and wherein a first ID is used to generate the second signaling, a first information block is used to generate the second signaling, the first information block is used to determine at least one of a candidate time-frequency resource set or a candidate reference signal resource set, and wherein whether the second signaling comprises the first ID is related to whether the first signaling comprises the first ID, wherein on a condition that the first signaling comprises the first ID, the second signaling does not comprise the first ID, and wherein on a condition that the first signaling does not comprise the first ID, the second signaling comprises the first ID; the first ID is a non-negative integer.

* * * * *